Patented July 25, 1933

1,919,792

UNITED STATES PATENT OFFICE

LUDWIG LICHTENSTEIN, OF VIENNA, AUSTRIA, AND JAKOB KLEIN, DECEASED, LATE OF KOENIGINHOF, CZECHOSLOVAKIA, BY HEDWIG MARTHA KLEIN, EXECUTRIX, OF BADEN, NEAR VIENNA, AUSTRIA

VAT DYE PRINTING

No Drawing. Application filed October 1, 1931. Serial No. 566,320.

This invention relates to printing cotton fabrics and the like with vat colors, and more particularly to the aging or fixing of such vat colors on the goods. The invention is applicable to printing vat colors of the indigoid type or of the mixed indigoid and anthraquinone type.

The printing of vat colors under the usual commercial practice is accomplished by printing them with hydrosulphite preparations and afterward aging them by a steaming process or the like. Early attempts to employ glucose as a reducing agent for vat colors of the indigoid or mixed indigoid and anthraquinone type were not entirely successful, due partly to the fact that the reduction by glucose in the steaming was too slow and the fixation not sufficiently strong.

Important objects of the present invention are to improve the quality of the work, to obtain better economy and reliability of operation, and to avoid certain of the disadvantages or difficulties which are encountered in printing with the usual hydrosulphite paste, or in the earlier attempts to fix the vat colors by the glucose process.

It has been found that the action of glucose in the steaming process can be satisfactorily accelerated by means of catalysts, to such an extent as to equal or even surpass the action of rongalites. The catalysts which it has been found can be used for this purpose are the anthraquinones, such as anthroquinone itself and its derivatives, which can be transformed into their corresponding oxyanthranolic compounds, as well as these latter compounds themselves, also other compounds containing carbonyl groups in paraposition which can be reduced, their potency being governed by the ease with which they are reduced. Substituted anthraquinone derivatives which may be mentioned as examples are methyl-, ethyl-, chlor- or bromanthraquinone and the like, as well as those derivatives of anthraquinone which contain the halogen on the side chain as, for example, brom-methyl-anthraquinone, and as further examples those which contain groups forming salts. Additional catalysts which can be regarded as equivalents under the broad principle of the invention are those compounds which contain the carbonyl group in paraposition and form compounds such as naphtho-quinone, naphthanthraquinone, and the like, or their derivatives.

The operations in accordance with the invention may be in general similar to those employed in printing with the hydrosulphite paste, the essential difference being that the fixing or aging of the vat color on the goods is accomplished by the action of glucose or similar carbohydrates, or stannous oxide, in the presence of alkali of substantially the strength of alkali metal carbonate and a catalyst. These printing pastes are just as easily handled as the hydrosulphite printing pastes, while at the same time they are cheap and produce a high yield. In the case of hand printing they offer the special advantage over the hydrosulphite paste process that the reducing agent does not decompose in the printing paste on slow drying, so that the printed cloth can even remain for days without being aged, and without danger of losing any depth of shade or yield in color.

The following will serve as examples of printing pastes, which can be employed in accordance with the invention.

EXAMPLE 1

*Printing paste*

40 grams brome-indigo
40 grams glycerine
60 grams silver salt (sodium-beta-anthraquinonemonosulphonate)
20 grams water
840 grams thickening BL

*Thickening BL*

68 grams aktivin 1/100 (sodium salt of para-toluolsulphochloramide)
68 grams wheat starch
120 grams glycerine
105 grams sodium carbonate (calc.)
330 grams water
270 grams glucose 1/1
38 grams British gum The aging and finishing of the printed goods are accomplished, for example, by passing the goods through the usual steaming chamber at about 215° F. for four or five minutes, after which the goods are reoxidized in any of the standard developers such as weak sulphuric acid and sodium bichromate, this step being followed by washing in water, then soaping at boiling temperature, and finally washing and drying the goods.

EXAMPLE 2

*Printing paste*

40 grams dyestuff powder
40 grams glycerine
80 grams water
60 grams silver salt (beta-anthraquinone-sodium-sulphonate)
780 grams thickening or 200 grams dyestuff paste
60 grams silver salt
740 grams thickening

*Thickening paste*

405 grams starch 1/5
100 grams artificial gum (crystal) 1/3
120 grams glycerine
105 grams sodium carbonate
270 grams glucose 1/1

The dyestuff may, for example, be of the indigoid type such as Helindone red 3B = #1212 (918) or 5:5'-dichloro-6:6'-dimethyl-2:2'-bis-thionaphthen-indigo; Ciba pink B = #1207 (912) or 2:2'-bis-thionaphthen-indigo; or Brilliant indigo 2B = #1188 (884) or 5:5'-dichloro-7:7'-dibromo-indigotin; or of the mixed indigoid and anthraquinone type such as, for example, Alizarine indigo G = #1202 (893) or = 2-(5:7 dibromoindole-) 2'-anthracene-indigo. The figure in brackets is the number contained in Schultz corresponding to the number in Color Index.

The finishing of the goods may follow substantially the procedure outlined in connection with Example 1.

In the above examples anthraquinone or any of its derivatives which are transformed by reducing agents into their corresponding oxy-anthranol reduction products can be substituted for the silver salt, and stannous oxide can be employed in place of glucose. Other carbohydrates similar to glucose may likewise be employed in place of the glucose or stannous oxide. While these stated substances are equivalents in general of the silver salt and glucose, the use of glucose in conjunction with silver salt is specifically preferred as giving the most satisfactory results and offering the greatest commercial advantage.

Since the use of glucose in conjunction with a catalyzer of the character described discharges all dyeings which are dischargeable with hydrosulphites, these printing pastes can be used on colored goods. The term "printing" is thus to be understood in the claims as including discharging.

The term "indigoid type" is employed in the claims to indicate not only the strictly indigoid dyestuffs, but to include as well those which are recognized as a mixture or combination of indigoid and anthraquinone character.

It is claimed:

1. The method of printing with vat dyestuffs of the indigoid type, which comprises as an essential step the fixing of the dyestuff by means of glucose in the presence of alkali metal carbonate and an anthraquinone or derivative thereof, transformable readily, by reducing agents, into its oxyanthranole or corresponding oxyanthranolic derivative.

2. The method of printing with vat dyestuffs of the indigoid type, which comprises applying to the goods a composition containing the indigoid dyestuff, glucose, an anthraquinone catalyst and an alkali metal carbonate, ageing the same in steam, and reoxidizing in a developer.

3. The method of printing with vat dyestuffs of the indigoid type, which comprises the fixing of the dyestuff by means of glucose in the presence of silver salt acting as a catalyst and alkali of substantially the strength of alkali metal carbonate.

LUDWIG LICHTENSTEIN,
HEDWIG MARTHA KLEIN,
*Executrix of the Estate of Jakob Klein, Deceased.*